United States Patent [19]

Satoh et al.

[11] Patent Number: 5,082,197
[45] Date of Patent: Jan. 21, 1992

[54] TAPE CASSETTE

[75] Inventors: Takateru Satoh; Kimio Tanaka, both of Saku; Haruo Shiba, Komoro; Noboru Uemura, Odawara; Kenkichi Akaoka, Saku, all of Japan

[73] Assignee: TDK Corporation, Tokyo, Japan

[21] Appl. No.: 375,248

[22] Filed: Jul. 3, 1989

[30] Foreign Application Priority Data

Jul. 4, 1988 [JP] Japan .............. 63-87985[U]

[51] Int. Cl.$^5$ ............................. G11B 23/00
[52] U.S. Cl. ...................... 242/199; 360/132
[58] Field of Search ............... 242/199, 200; 360/132, 360/130.2, 130.22, 130.23; 206/307, 387, 389

[56] References Cited

U.S. PATENT DOCUMENTS

| 4,330,068 | 5/1982 | Shoji | 242/199 X |
|---|---|---|---|
| 4,387,823 | 7/1983 | Shiba | 242/199 X |
| 4,457,473 | 7/1984 | Mroz et al. | 242/199 X |
| 4,545,500 | 10/1985 | Yamaguchi et al. | 206/387 X |
| 4,566,653 | 1/1986 | Bettinger et al. | 242/199 |
| 4,754,938 | 7/1988 | Satoh | 242/199 |
| 4,767,007 | 8/1988 | Oishi et al. | 206/387 |
| 4,791,484 | 12/1988 | Sasaki | 360/132 |
| 4,793,570 | 12/1988 | Gelardi et al. | 242/199 |

FOREIGN PATENT DOCUMENTS

| 2526484 | 1/1976 | Fed. Rep. of Germany | 360/132 |
|---|---|---|---|
| 55-160573 | 11/1980 | Japan | |

*Primary Examiner*—Katherine Matecki
*Assistant Examiner*—John P. Darling
*Attorney, Agent, or Firm*—Price, Gess & Ubell

[57] ABSTRACT

A tape cassette is provided which is so constructed that a plurality of weighting members are fittedly held in fitting apertures or recesses of a casing formed at corners of the casing in a detachable manner while being exposed at part thereof on a surface of the casing. Such construction of the cassette not only permits the cassette to exhibit optimum vibration-damping properties to ensure satisfactory recording and reproducing of the cassette and contributes an improvement in mechanical strength of the cassette but provides the cassette with a variation in design sufficient to exhibit good aesthetic properties, to thereby increase a merchandise value of the cassette.

8 Claims, 3 Drawing Sheets

TAPE CASSETTE

BACKGROUND OF THE INVENTION

This invention relates to a tape cassette, and more particularly to a tape cassette in which a magnetic tape such as an audio tape, a video tape or the like is received for recording and/or reproducing.

Conventionally, a magnetic tape such as an audio tape, a video tape or the like is rotatably received in a casing while being wound on a pair of reel hubs in a manner to be stretched therebetween. The casing used for this purpose generally comprises two casing halves or an upper casing member and a lower casing member formed of a synthetic resin material and joined together.

The so-formed conventional casing for a magnetic tape cassette is reduced in strength and light-weight, accordingly, vibration or shock applied to the casing during the recording or reproducing operation is transmitted directly to a tape traveling in the casing, to thereby deteriorate the characteristics of a sound produced from the tape and adversely affect recording and reproducing carried out by traveling of the tape. Also, this leads to a break or deformation of the casing by dropping or stamping. In order to solve such a problem, it is proposed to locally arrange a weighting element in the casing as disclosed in Japanese Utility Model Application Laying-Open Publication No. 160573/1980. Also, it is proposed to incorporate a weighting material such as metal powder in a material for the casing to weight the casing, resulting in restraining transmission of vibration or shock from the casing to the tape and/or increasing mechanical strength of the casing.

Such approaches effectively restrains transmission of vibration from the casing to the tape and increases weight of the casing because the weighting element or material is arranged in the casing or included in the casing material. However, this approach does not detachably arrange the weighting element or material at the casing. Accordingly, once the weighting element or material is provided at the casing, it is not possible to adjust and replace it, leading to a failure in improvement in strength of the casing and adjustment of vibration-damping properties of the casing or cassette after arrangement of the weighting means at the casing.

It would be considered an advantage if such weighting means is provided with any desired design such as a configuration, a pattern or the like which exhibits a decorative effect. Unfortunately, the above-described fact of the prior art that the weighting means is not replaceable also hinders the decorative effect from being varied, resulting in a failure to enhance the appearance and aesthetic properties of the tape cassette.

Accordingly, it would be highly desirable to develop a tape cassette which is capable of carrying out an improvement in mechanical strength of the cassette and adjustment of vibration-damping properties of the cassette after assembling of the cassette, as well as enhancing the aesthetic properties of the cassette.

SUMMARY OF THE INVENTION

In accordance with the present invention, a tape cassette is provided. The tape cassette includes a casing which is constituted by an upper casing member and a lower casing member joined together to define a space therein. In the casing are rotatably arranged a pair of reel hubs, on which a magnetic tape is wound while being stretched therebetween. The tape cassette also includes at least one weighting means of vibration-damping properties disposed at the casing. The casing is formed with at least one fitting means, in which the weighting means is detachably held.

In a preferred embodiment of the present invention, the weighting means is exposed at a part thereof on a surface of the casing and the weighting means is made of a single metal material. Alternatively, the weighting means may be made of at least two kinds of heterogeneous metal materials.

In a further preferred embodiment of the present invention, the weighting means is arranged at any portion of the casing except an area thereof covering a maximum diameter of the tape wound on the reel hubs. The weighting means may be arranged at each of the corners of the casing.

In a preferred embodiment of the present invention, the weighting means is formed into a block-like shape. The weighting means can be exposed at a part thereof on the upper and lower surfaces of said casing. The weighting means may also be exposed on a side surface of the casing. Alternatively, the weighting means may be formed into a plate-like shape and the fitting means comprises a recess formed on an outer surface of the casing.

The weighting means may be formed with at least one screw inserting hole, through which a screw is inserted for detachably fixing the weighting means at the casing as well as joining the upper and lower casing members together.

Accordingly, it is an object of the present invention to provide a tape cassette which is capable of carrying out an improvement in mechanical strength of the cassette and adjustment of vibration-damping properties of the cassette after assembling of the cassette.

It is another object of the present invention to provide a tape cassette which is capable of enhancing the aesthetic properties of the cassette.

It is a further object of the present invention to provide a tape cassette which is capable of effectively restraining transmission of vibration or shock applied from the exterior to a tape in a casing.

It is still another object of the present invention to provide a tape cassette which is capable of enhancing the mechanical strength of the cassette.

It is a still further object of the present invention to provide a tape cassette which is capable of accomplishing the above-described objects with a simple structure.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENTS

Now, a tape cassette according to the present invention will be described hereinafter with reference to the accompanying drawings.

The following description will be made in connection with an audio magnetic tape cassette, however, the present invention is not limited to such a tape cassette.

Figure 1:
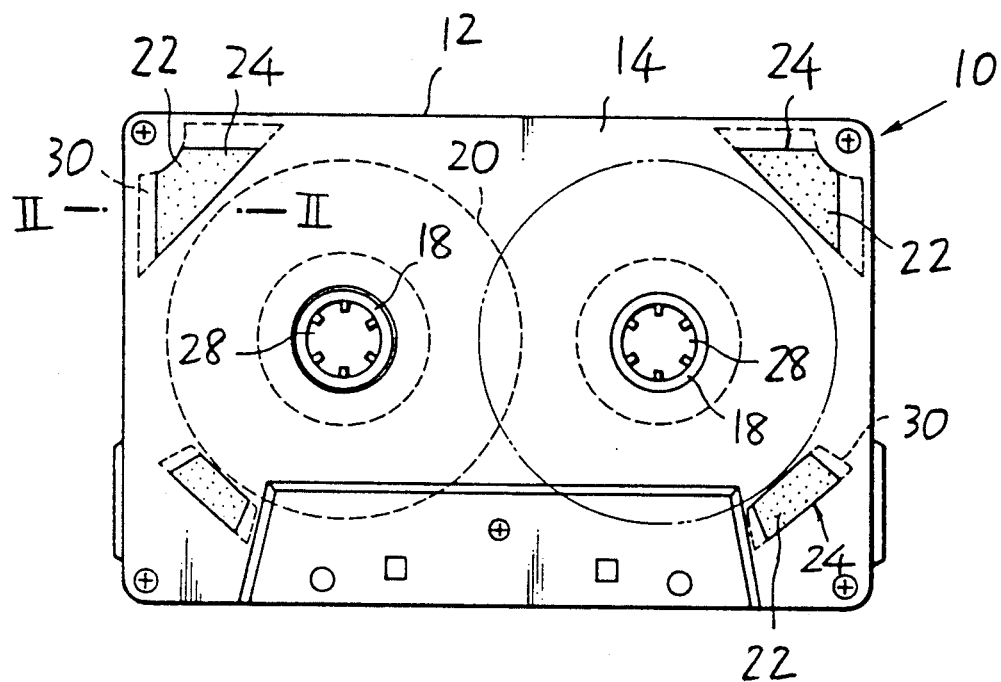
FIG. 1 is a plan view showing an embodiment of a tape cassette according to the present invention.
Figure 2:
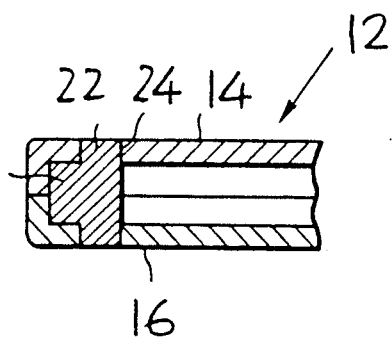
FIG. 2 is an enlarged sectional view taken along line II—II of FIG. 1.
Figure 3:
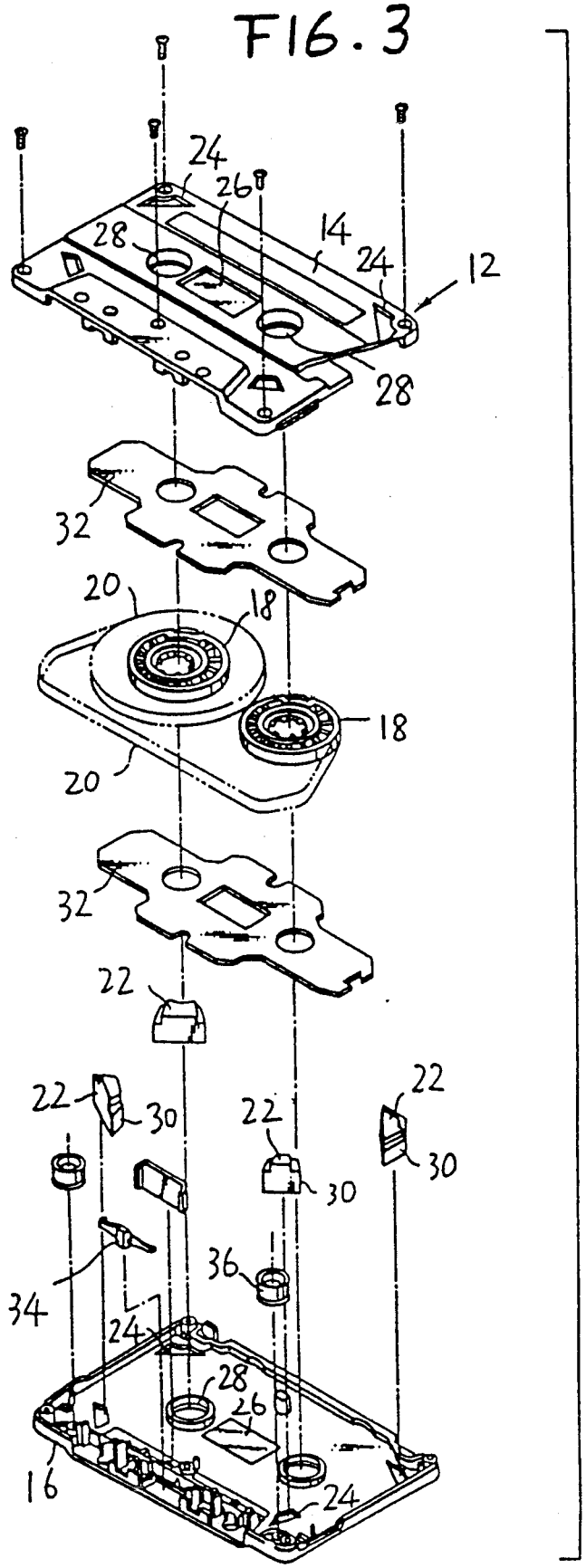
FIG. 3 is an exploded perspective view of the tape cassette shown in FIG. 1.

FIGS. 1 to 3 illustrate an audio magnetic tape cassette which is an embodiment of a tape cassette according to the present invention. A tape cassette of the illustrated embodiment which is generally designated by reference numeral 10 includes a casing 12 constituted by an upper casing member 14 and a lower casing member 16 joined together so as to define a space therein. In the casing 12 are rotatably arranged a pair of reel hubs 18, on which a magnetic tape 20 is wound in a manner to be stretched between the reel hubs 18. Also, the tape cassette 10 includes at least one weighting means or member 22 arranged at the casing 12. The weighting means 22 is held at the casing 12 in a manner to be detachably fitted in at least one fitting means 24 formed at the casing such as an aperture, a recess or the like while being preferably exposed at a part thereof on any surface of the casing such as its outer surface, its inner surface or the like.

The weighting means 22 may be formed of a weighting material of vibration-damping properties such as a metal material or the like. The weighting means 22 may be made of a single metal material. The weighting means 22 may be arranged and formed so that the cassette 10 may exhibit satisfactory vibration-damping properties sufficient to restrain or prevent vibration or shock applied from the exterior to the casing 12 from being transmitted to the tape 20. For example, it may be formed into a plate-like shape, a block-like shape or the like. Alternatively, it may be made of at least two kinds of heterogeneous metal materials such as a combination of copper and stainless steel into a composite or laminated configuration. This results in the casing or cassette being provided with a variation in design such as tone sufficient to exhibit good aesthetic properties.

In the illustrated embodiment, the so-formed weighting means 22 is detachably arranged at the casing while being preferably exposed. For this purpose, at least one fitting means 24 is provided at the casing 12 for detachably fittedly holding the weighting means 22 therein, as described above. In the tape cassette of FIGS. 1 to 3, the fitting means 24 may comprise an aperture formed at the casing 12 so as to substantially vertically extend through the casing, to thereby permit the weighting means 22 to be exposed at a part thereof on the outer surface of the casing. The surface of the casing on which the fitting means 24 is exposed is not limited to the outer surface of the casing. It may be an inner surface of the casing so long as the weighting means 22 is detachably arranged at the casing while being preferably exposed. The aperture 24 and therefore the weighting means 22 may be arranged at a portion of the casing except an area thereof covering a maximum diameter of the tape wound on the reel hubs 18 such as, for example, a corner of the casing. In FIGS. 1 to 3, the weighting means 22 and therefore the aperture 24 are positioned at each of the corners of the casing. Thus, in the illustrated embodiment, four such weighting means 22 in the form of a block-like shape and four such apertures 24 are arranged. Also, the weighting block 22 is arranged at the casing 12 in a manner to be inserted through the aperture 24 at each of the corners. Alternatively, it may be fixed at the corner by a tapping screw or the like.

As described above, the aperture 24 and therefore the weighting means or block 22 may be arranged at the portion of the casing 12 except its area covering a maximum diameter of the tape 20 wound on the reel hubs 18. More specifically, in the embodiment, the weighting means 22 are arranged at locations of the casing other than a tape traveling area of the casing including a visible window 26 and hub openings 28 while being aesthetically balanced with one another. For this purpose, in the illustrated embodiment, the weighting means 22 each are formed into a block-like shape of which a lower portion 30 is expanded like a flange, as shown in FIG. 3. The so-formed weighting blocks 22 each are fitted in the aperture 24 in a manner to be exposed at a part thereof on the outer surface of the casing 12 and more specifically on its upper and lower surfaces, to thereby cause design of the cassette to be varied.

In FIG. 3, reference numeral 32 designates sheet members arranged between the tape 20 and the casing 12 as required, 34 is a pad and 36 indicates rollers.

Figure 4:
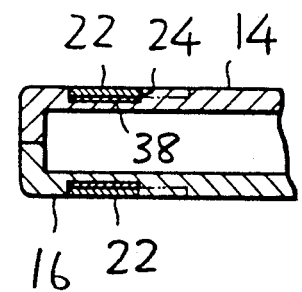
FIG. 4 is a fragmentary vertical sectional view showing another embodiment of a tape cassette according to the present invention.

FIG. 4 shows another embodiment of a tape cassette according to the present invention. The embodiment is so constructed that weighting means 22 each are formed into a plate-like shape and fitting means 24 each comprise a recess formed on an outer surface of a casing 12. The weighting plates 22 each are detachably fitted in the fitting recess 24 using suitable means 38 such as a screw, a tape fastener or the like. The weighting plate 22 may be provided with any design element so as to exhibit additional aesthetic properties. The remaining part of the embodiment of FIG. 4 may be constructed in substantially the same manner as that shown in FIGS. 1 to 3.

Figure 5:
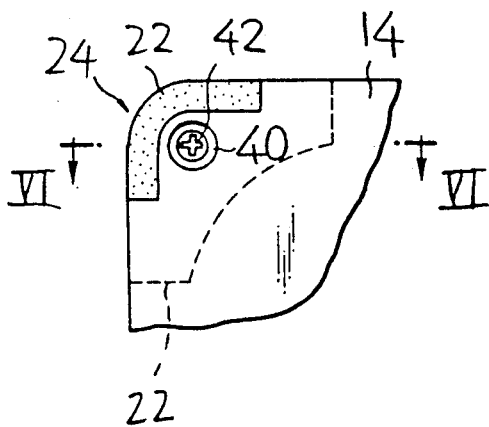
FIG. 5 is a fragmentary plan view showing a further embodiment of a tape cassette according to the present invention.
Figure 6:
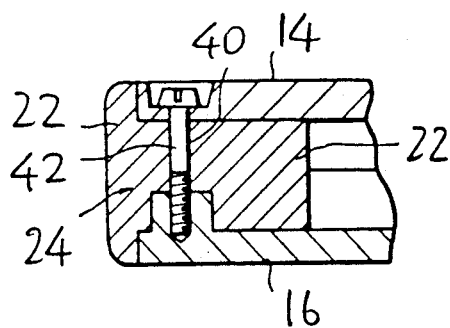
FIG. 6 is a sectional view taken along line VI—VI of FIG. 5.

FIGS. 5 and 6 show a further embodiment of a tape cassette according to the present invention. In the embodiment, fitting means 24 each comprise a sideways aperture formed on an outer surface of each corner of a casing 12 and weighting means 22 in the form of a block-like shape each are inserted in the aperture 24 while being exposed on the outer surface of the casing 12 and more specifically on a side surface of the corner. The weighting block 22 is formed with a through-hole 40, via which a screw 42 for joining upper and lower casing members 14 and 16 together is inserted to detachably fix the weighting block 22 with respect to the casing 12 as well as assemble the casing. Such construction of the embodiment effectively prevents damage of the corners of the casing 12 due to dropping and permits weight of the cassette to be balanced because the weighting block of high strength is arranged at each corner of the casing while being exposed on the corner surface. The remaining part of the embodiment may be constructed in substantially the same manner as that of FIGS. 1 to 3.

Figure 7:
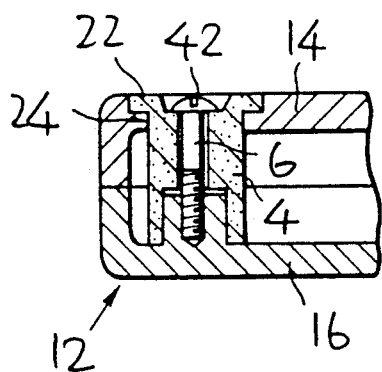
FIG. 7 is a fragmentary vertical sectional view showing still another embodiment of a tape cassette according to the present invention.
Figure 8:
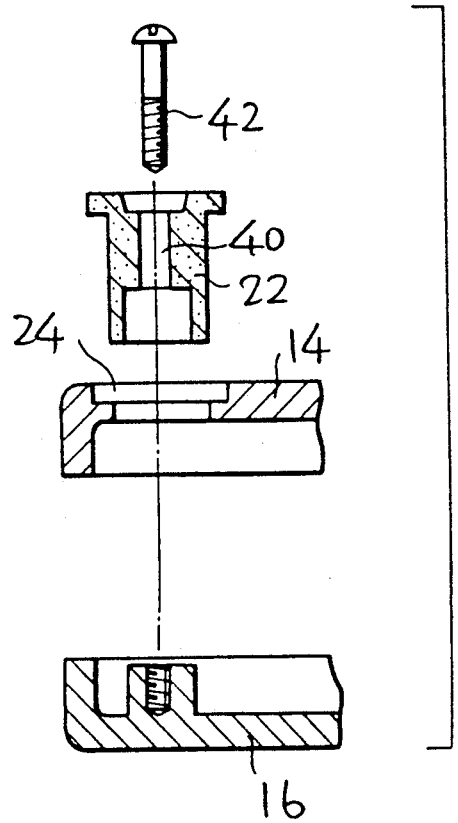
FIG. 8 is a fragmentary exploded vertical sectional view of the tape cassette shown in FIG. 8.

FIGS. 7 and 8 show still another embodiment of a tape cassette according to the present invention, wherein fitting means 24 each comprise an aperture formed at each corner portion of an upper casing member 14 and weighting means 22 is inserted through the fitting aperture 24 of the upper casing member 14 into a casing 12 and put on a lower casing member 16 while being exposed on the outer surface of the casing. The weighting means 22 is detachably fixed with respect to the casing 12 by a screw 42 inserted via a through-hole 40 of the means 22 as in the embodiment of FIGS. 5 and 6. The remaining part of the embodiment may be constructed in substantially the same manner as the embodiment of FIGS. 5 and 6.

In each of the embodiments described above, a plurality of the weighting means 22 in the form of a block-like or plate-like shape are substantially symmetrically arranged. However, the present invention is not limited to such arrangement and configuration of the weighting means so long as provision of the weighting means causes the exhibits vibration-damping properties of absorbing harmful vibration or shock applied to the casing from the exterior to prevent transmission of the vibration or shock to the tape, to thereby ensure smooth and safe traveling of the tape.

Figure 9:
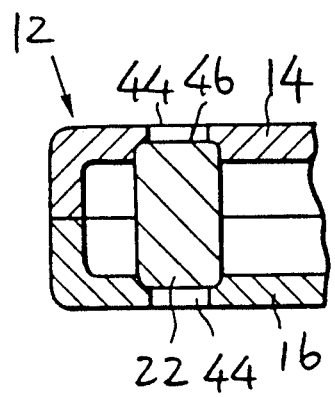
FIG. 9 is a fragmentary vertical sectional view showing still a further embodiment of a tape cassette according to the present invention.

FIG. 9 shows still a further embodiment of a tape cassette according to the present invention, wherein upper and lower casing members 14 and 16 are formed at corners thereof with through-holes 44 vertically aligned with each other, respectively. The through-holes 44 are enlarged at inner ends thereof to define recesses 46 opposite to each other, which cooperate together to form fitting means 24. Each of the weighting means 22 is formed into a cylindrical shape and detachably received or held in the fitting means 24 in a manner to extend between the upper casing member and the lower casing member in the casing 12 while being exposed on an inner surface of the casing 12. Such construction of the embodiment prevents dislocation of the weighting means 22 from the casing 12.

As can be seen from the foregoing, the tape cassette of the present invention is so constructed that at least one weighting means is detachably held in the fitting means formed at the casing. Such construction permits the design of the tape cassette to be varied over a considerable degree of freedom to provide the cassette with good aesthetic properties sufficient to increase its merchandise value while permitting the weighting means to restrain transmission of vibration or shock from the exterior to the tape in the casing, resulting in the cassette exhibiting optimum vibration-damping properties to satisfactorily carry out recording and reproducing, as well as enhancing mechanical strength of the cassette.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A tape cassette comprising:
    a rectangular casing comprising an upper casing member and a lower casing member joined together to define a space therein, said casing members having apertures adjacent each of their respective corners on their exterior surface;
    a pair of reel hubs rotatably arranged in said casing;
    a magnetic tape wound on said reel hubs while being stretched therebetween; and
    at least four separate and spaced weighting elements, each having a mounting flange and a vibration-damping property and disposed on said casing adjacent said respective corners thereof;
    said casing being formed with fitting means including said aperture adjacent each corner for receiving said weighting elements;
    said weighting elements being detachably held in said fitting means of said casing to extend through said apertures so that the upper and lower surfaces of said weighting element are, respectively, approximately co-planar with a corresponding surface of said upper and lower casing members and said mounting flanges extend within said casing.

2. A tape cassette as defined in claim 1, wherein said weighting elements are made of a single metal material.

3. A tape cassette as defined in claim 1, wherein at least one of said weighting elements is made of at least two kinds of heterogeneous metal materials.

4. A tape cassette as defined in claim 1, wherein said weighting elements are formed into a block-like shape.

5. A tape cassette as defined in claim 4, wherein said weighting elements are exposed on upper and lower surfaces of said casing.

6. A tape cassette as defined in claim 4, wherein said weighting elements are exposed on a side surface of said casing.

7. A tape cassette as defined in claim 1, wherein said weighting elements are formed with at least one screw inserting hole, through which a screw is inserted for detachably fixing said weighting elements are said casing as well as joining said upper and lower casing members together.

8. A tape cassette as defined in claim 1, wherein said upper and lower casing members are formed at each of corners thereof with through-holes vertically aligned with each other, respectively,
    said through-holes being enlarged at inner ends thereof to define said fitting means in cooperation with each other;
    said weighting means being received in said fitting means in a manner to extend between said upper casing, member and said lower casing member in said casing while being exposed on an inner surface of said casing.

* * * * *